United States Patent
Moss

(10) Patent No.: US 6,185,093 B1
(45) Date of Patent: *Feb. 6, 2001

(54) EXPANSION CARD CARRIER AND METHOD FOR A COMPUTER SYSTEM

(75) Inventor: David L. Moss, Austin, TX (US)

(73) Assignee: Dell, USA, L. P., Round Rock, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/967,836

(22) Filed: Nov. 12, 1997

(51) Int. Cl.[7] ................................. G06F 1/16; H05K 7/10
(52) U.S. Cl. ........................... 361/684; 361/752; 439/74
(58) Field of Search ................................ 361/684, 683, 361/685, 728, 729, 730, 736, 752, 796, 797, 802; 439/74, 76.1

(56) References Cited

U.S. PATENT DOCUMENTS

| | | | |
|---|---|---|---|
| 4,323,979 | * | 4/1982 | Johnston ............................ 364/708 |
| 4,840,570 | * | 6/1989 | Mann, Jr. et al. ..................... 439/74 |
| 5,367,571 | | 11/1994 | Bowen et al. . |
| 5,396,401 | * | 3/1995 | Nemoz ................................ 361/690 |
| 5,400,216 | * | 3/1995 | Tsai ..................................... 361/684 |
| 5,446,621 | * | 8/1995 | Jansen et al. ....................... 361/729 |
| 5,537,292 | | 7/1996 | Bowen . |
| 5,572,400 | * | 11/1996 | Roesner et al. ..................... 361/683 |
| 5,576,935 | * | 11/1996 | Freer et al. ......................... 361/785 |
| 5,579,204 | * | 11/1996 | Nelson et al. ....................... 361/685 |
| 5,592,366 | * | 1/1997 | Goldman et al. .................... 361/796 |
| 5,617,296 | * | 4/1997 | Melville et al. ..................... 361/736 |
| 5,640,309 | * | 6/1997 | Carney et al. ....................... 361/801 |
| 5,694,291 | * | 12/1997 | Feightner ............................ 361/683 |
| 5,734,549 | * | 3/1998 | Oura ................................... 361/685 |
| 5,740,020 | * | 4/1998 | Palatov ............................... 361/796 |
| 5,796,583 | * | 8/1998 | Gale et al. .......................... 361/704 |

* cited by examiner

Primary Examiner—Benjamin R. Fuller
Assistant Examiner—Jagdish Patel
(74) Attorney, Agent, or Firm—Haynes and Boone, LLP

(57) ABSTRACT

A computer system includes a chassis having a slot in a side panel. An expansion card carrier is removably mounted in the chassis by being inserted into and removed from the slot. The carrier includes a jumper board which has a first connector and a second connector. An expansion card is mounted on the jumper board. The expansion card has a connector which engages the first connector of the jumper board. The second connector is coupled to the first connector and is positioned at an end of the carrier for being plugged into a connector within the chassis.

12 Claims, 5 Drawing Sheets

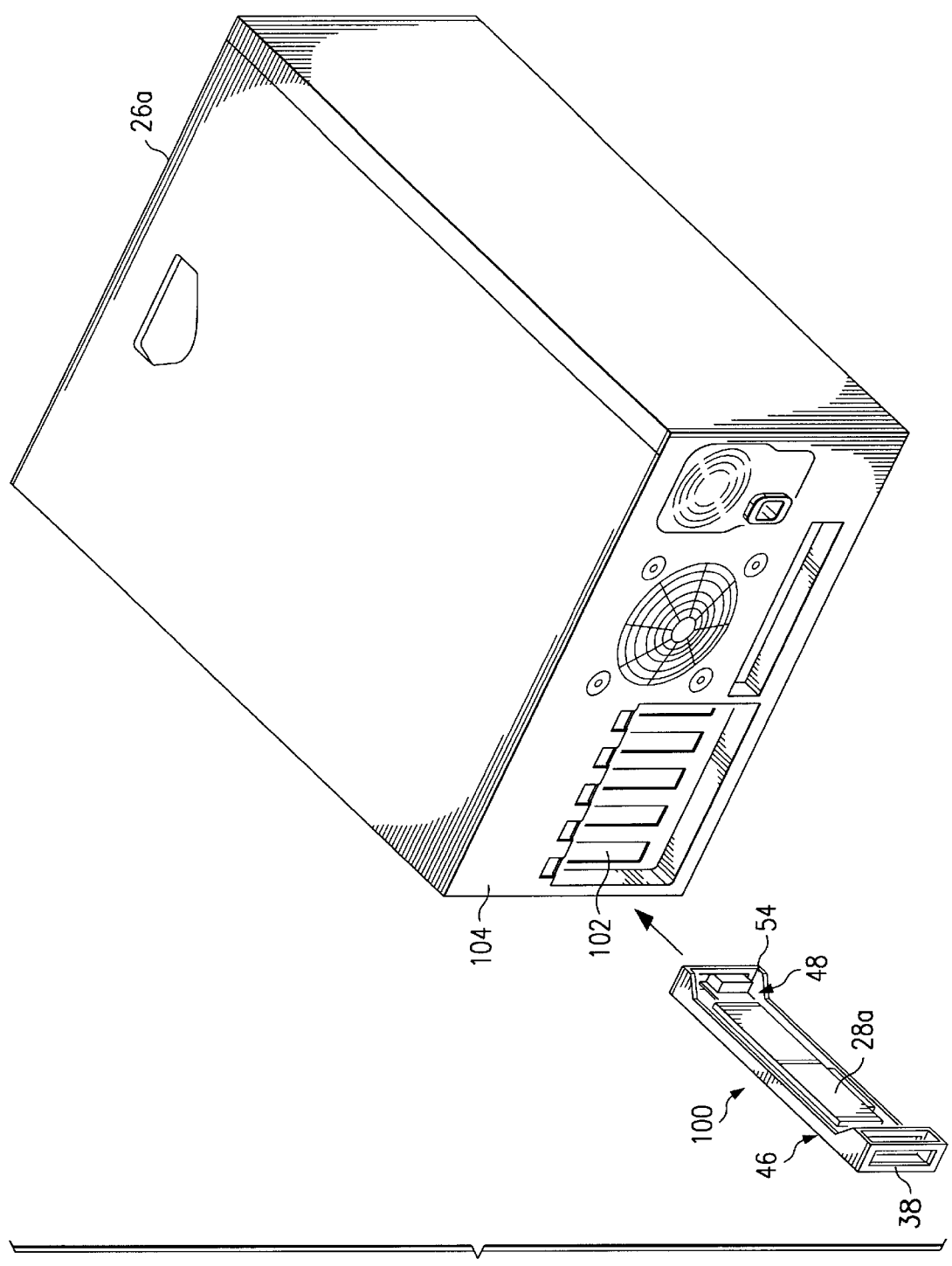

EXPANSION CARD CARRIER AND METHOD FOR A COMPUTER SYSTEM

BACKGROUND

The disclosures herein relate generally to a computer chassis and more particularly to the insertion and removal of expansion cards in a alive chassis.

The use of PCI expansion cards in computer chassis is well known. It often becomes necessary or desirable to add or replace these cards in a live chassis, i.e. a chassis that is in an operating mode. Typically, expansion cards include a plug which extends from one edge thereof. The cards are mounted in the chassis in a vertical orientation with the plug edge connected into a horizontal motherboard. This arrangement requires vertical insertion and removal of the card.

However, in order to vertically insert or remove a card, the chassis top cover must be removed. This requires removal of fastening devices which hold the cover in place. As a result, the cover removal is time consuming. Removal of the cover of a live chassis and insertion or removal of a card therein presents additional problems. In some instances, the chassis may be mounted in a component rack. Component racks are used to store components of computer systems in a centralized location. The racks are tall metal cabinets with trays for supporting components including a chassis. If a chassis is mounted in a component rack, and an expansion card is to be added or removed, the chassis must first be removed from the rack after which the chassis cover can be removed to permit access to insert and/or remove expansion cards.

Other problems associated with inserting the expansion cards on the board. The include alignment of the card plug with the plug on the mother board, the card edge connector insertion/extraction force is quite large, and strain relief of the expansion card and the mother board requires consideration.

Therefore, what is needed is a device which protects and aligns an expansion card during insertion and removal of the card from a live chassis so that chassis covers do not have to be removed and the chassis does not have to be removed from a rack or cabinet.

SUMMARY

One embodiment, accordingly, includes an apparatus and a method for providing quick and easy insertion and removal of an expansion card through a slot It in a side of a computer chassis. To this end, an expansion card assembly is provided including a card carrier. A jumper board is mounted in the carrier. A card is mounted on the jumper board and a connector on the card engages a first connector on the jumper board. A second connector on the jumper board is positioned adjacent an end of the carrier and is coupled to the first connector.

A principal advantage of this embodiment is that the carrier is removably insertable into the chassis to position the second connector of the jumper board for engagement with a connector in the chassis. The plug-in requirement of the card is transferred to the jumper board which is carried and supported by the card carrier.

BRIEF DESCRIPTION OF THE DRAWINGS

FIG. 10 is an isometric view illustrating an embodiment of a carrier assembly being inserted into a slot in the chassis.

DETAILED DESCRIPTION OF THE PREFERRED EMBODIMENT

Figure 1:
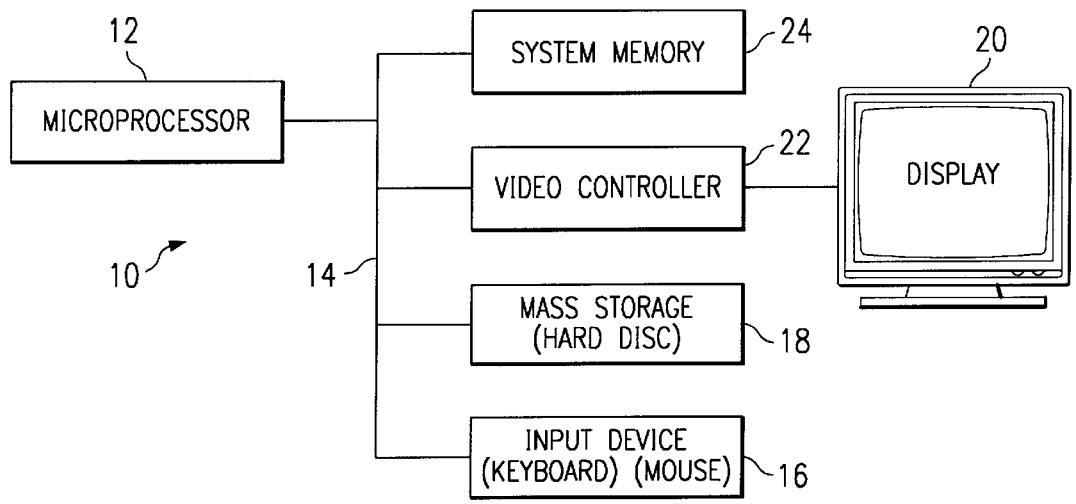
FIG. 1 is a diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
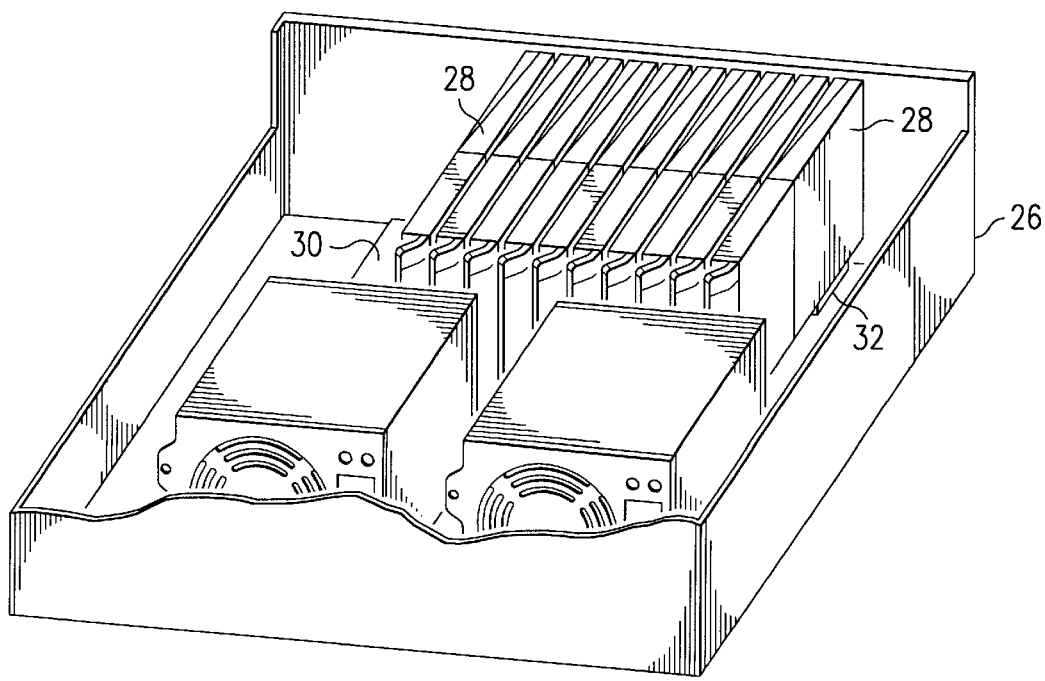
FIG. 2 is an isometric view illustrating prior art expansion cards mounted on connectors in the motherboard in the base of a chassis.
Figure 3:
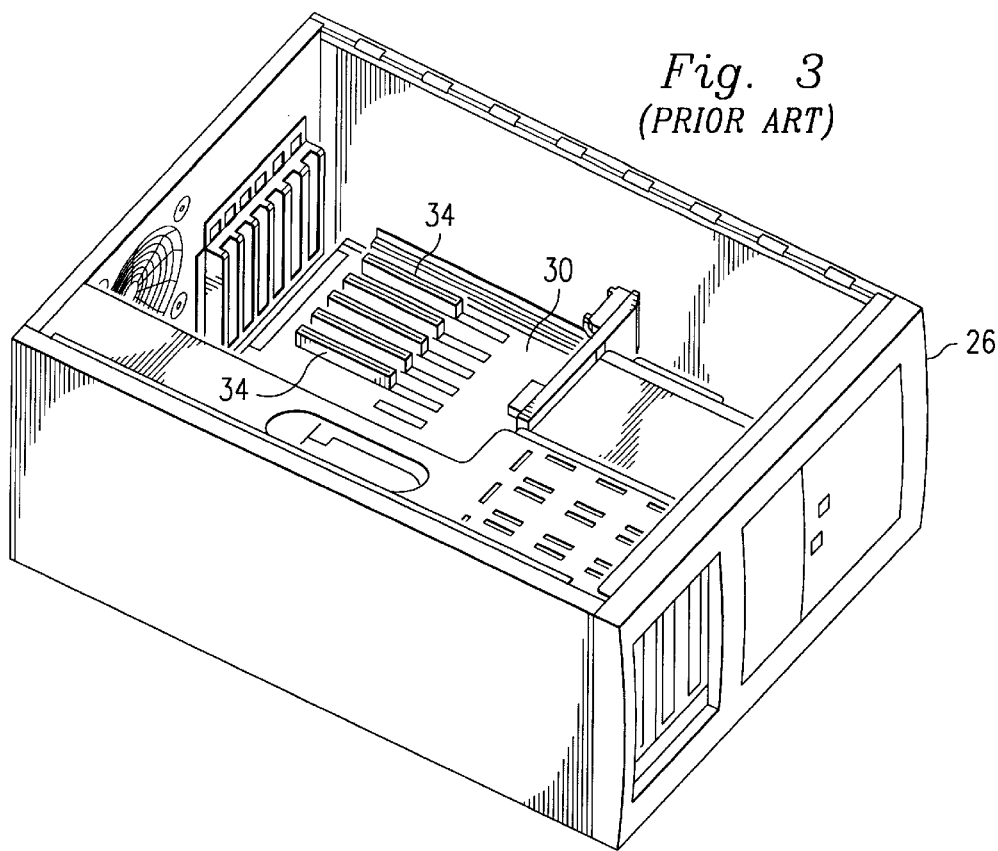
FIG. 3 is an isometric view illustrating a prior art chassis and motherboard including connectors to receive the expansion cards.

In FIG. 2, a known chassis 26 of system 10 includes a plurality of PCI expansion cards 28 mounted on a motherboard 30 by expansion card connectors 32. Another view, FIG. 3, of known chassis 26 illustrates motherboard 30 including a plurality of connectors 34 which are positioned to receive connectors 32 of expansion cards 28. In order to insert or extract the cards 28 from chassis 26, it is necessary to remove a top cover (not shown) from chassis 26 and insert cards 28 in a top-down manner so that expansion card connectors 32 are inserted downwardly into connectors 34 mounted on motherboard 30. If such insertion and extraction is done in a hot-plug operation, i.e. in a "live" chassis, there is a possibility of touching an adjacent "live" card and incurring damage to system 10.

Figure 4:
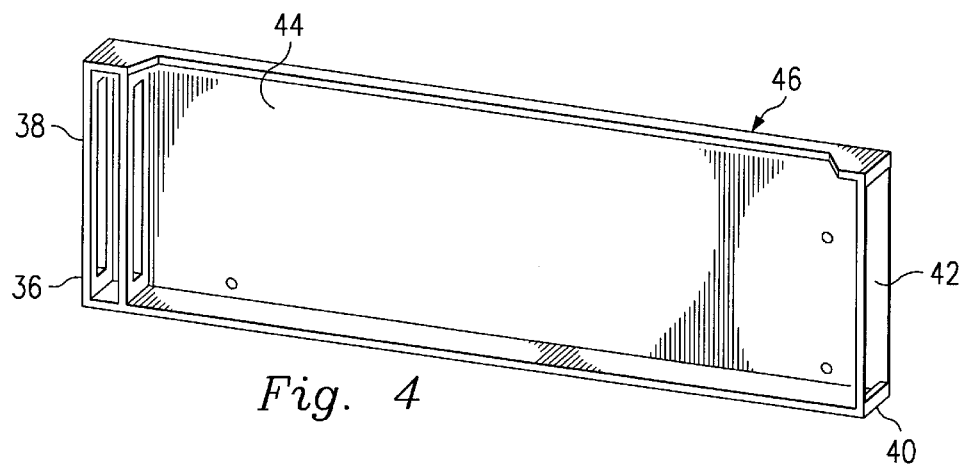
FIG. 4 is an isometric view illustrating an embodiment of a carrier.
Figure 5:
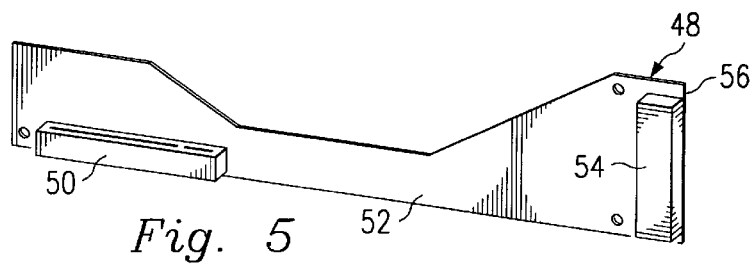
FIG. 5 is an isometric view illustrating an embodiment of a jumper board.

In order to overcome the problems associated with top-down insertion as it is presently known, an expansion card carrier 46 is provided, FIG. 4, formed of plastic, including a first end 36 having a handle 38, an opposite second end 40 having a connector slot 42 formed therein, and a support wall 44 extending from first end 36 to second end 40. A jumper board 48, FIG. 5, is formed of printed circuit board material and includes a first connector 50, mounted adjacent an edge 52 thereof and a second connector 54, mounted adjacent an end 56 thereof. Connectors 50, 54 are electrically coupled together by circuit traces so that electrical connection to connector 50 accomplishes electrical connection to connector 54.

Figure 6:
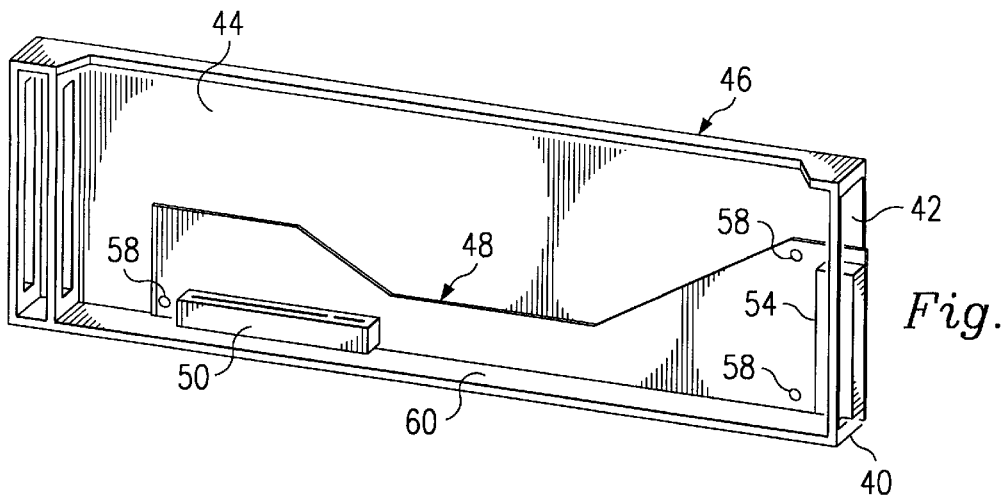
FIG. 6 is an isometric view illustrating an embodiment of the jumper board mounted in the carrier.

Jumper board 48, FIG. 6, is provided to be mounted on support wall 44 of carrier 46 by a suitable means of attachment such as fastening members 58 which may include screws or rivets for example. In this manner, first connector 50 is positioned along a base member 60 of carrier 46 and second connector 54 is positioned adjacent connector slot 42 of carrier 46.

Figure 7:
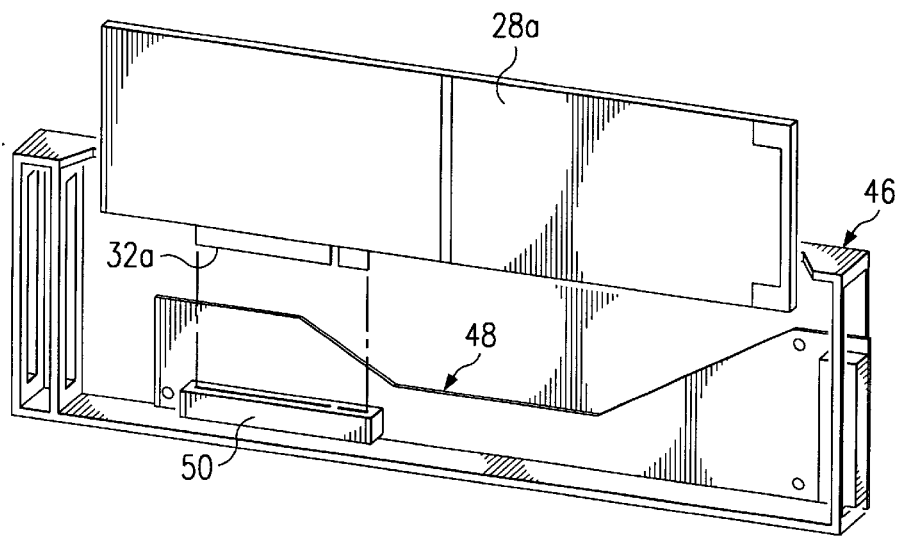
FIG. 7 is an isometric view illustrating an embodiment of an expansion card being inserted into the carrier.
Figure 8:
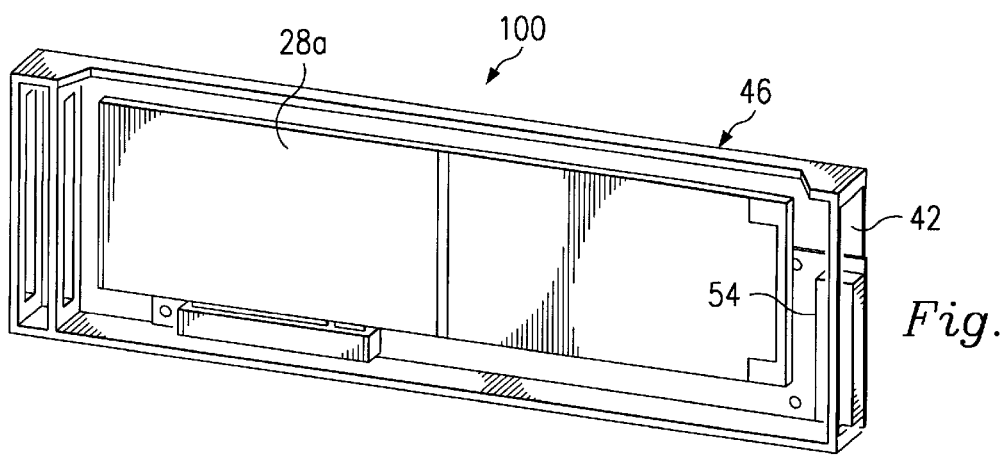
FIG. 8 is an isometric view illustrating an embodiment of the expansion card mounted in the carrier.
Figure 9:
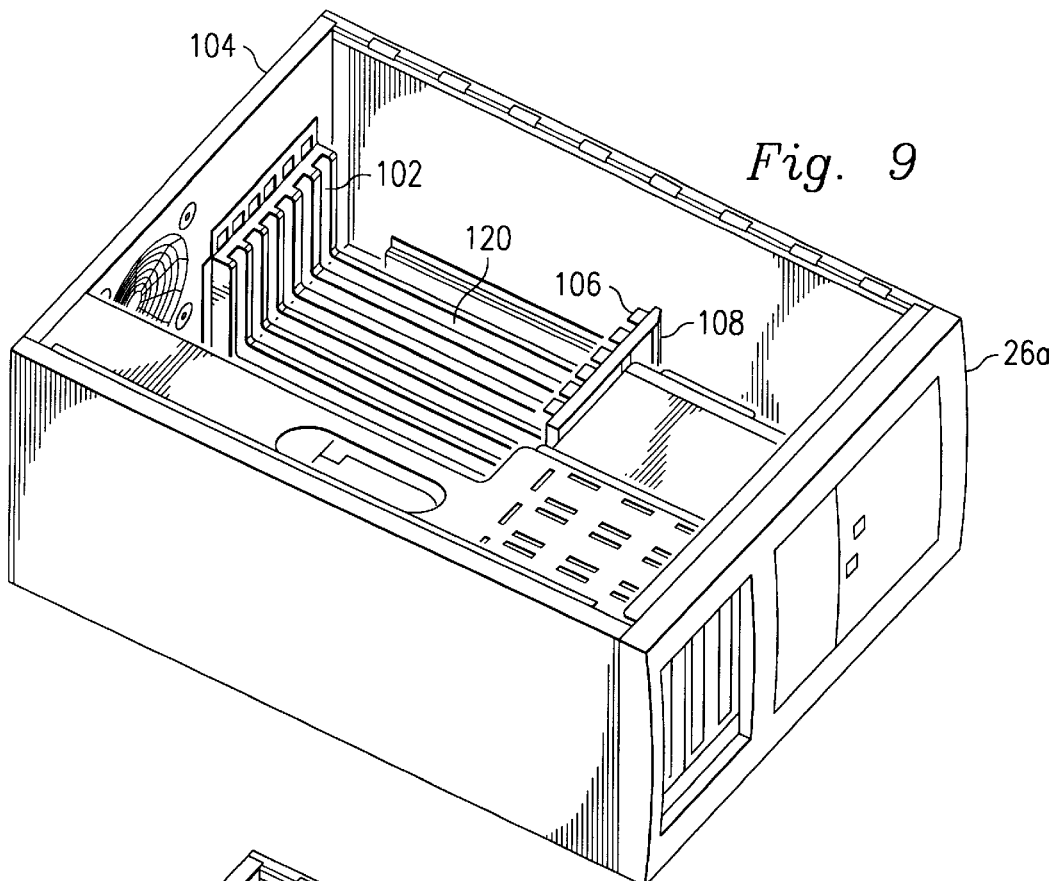
FIG. 9 is an isometric view illustrating an embodiment of the chassis for receiving card carriers.
Figure 11:
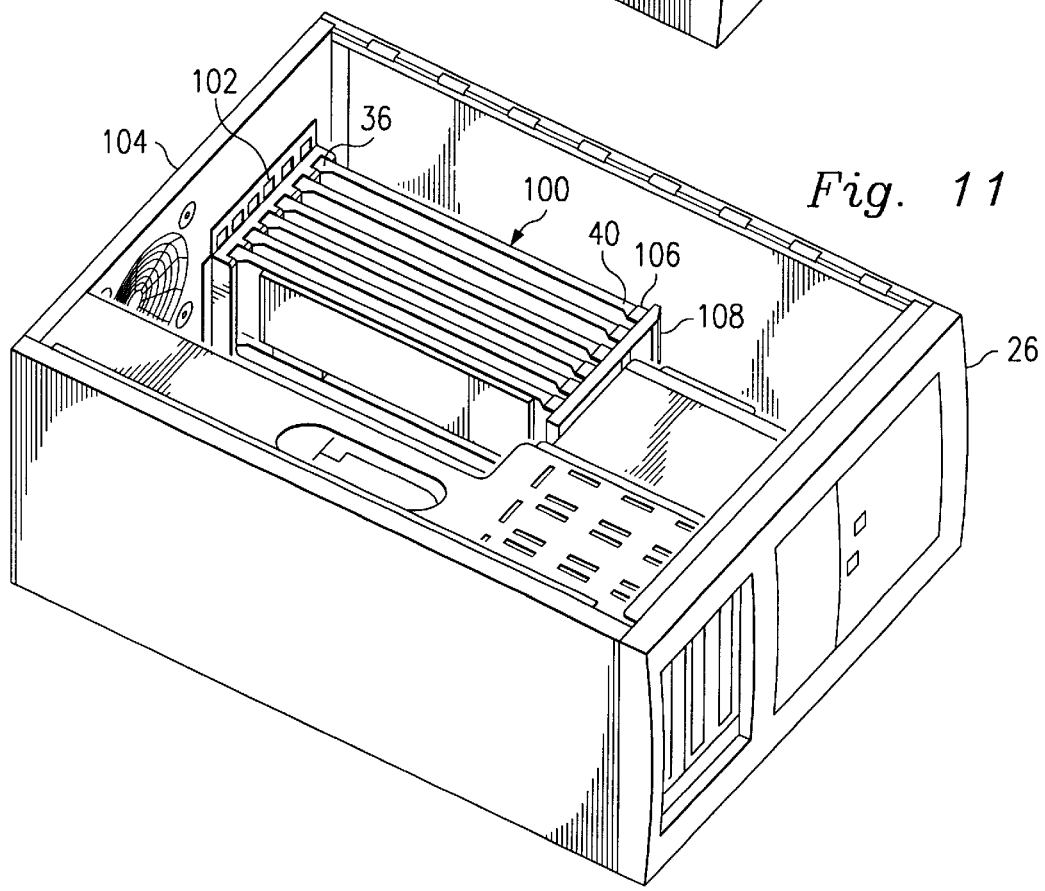
FIG. 11 is an isometric view illustrating an embodiment of the chassis including card carriers mounted therein.

A PCI expansion card 28a, FIG. 7, is mounted in carrier 46 by inserting an edge mounted card connector 32a into first connector 50 of jumper board 48. Additional means (not shown) may be used to secure expansion card 28a in carrier 46 if deemed necessary. In this manner, card 28a is mounted in carrier 46 in such a manner that card 28a is electrically coupled to second connector 54 which is adjacent connector slot 42, and card 28a is ready for insertion as a carrier assembly 100 into a modified chassis 26a, FIGS. 9 and 10 of system 10 including a chassis top cover 27. This is accomplished by inserting the carrier assembly 100, FIG. 10, including card 28a, jumper board 48 and carrier 46, through a carrier slot 102 formed in a sidewall 104 of chassis 26a without removal of a chassis top cover 27. Each carrier assembly is slidably engaged by a suitable guide member 120, FIG. 9, which may be a slotted or raised guide, extending between carrier slot 102 and a vertical backplane 108. This enables connection of connector 54, FIG. 10, to a connector 106, FIG. 9, mounted on the vertical backplane 108 in chassis 26a. When fully seated in chassis 26a, FIG. 11, each carrier assembly 100 has end 36, including handle 38, FIG. 10, positioned adjacent slot 102 in sidewall 104, and has end 40 interconnected with connector 106 at backplane 108 of chassis 26a.

In operation, the jumper board 48 is mounted in carrier 46. This positions jumper board connector 50 for receiving the expansion card connector 32a and positions jumper board connector 54 adjacent connector slot 42 of carrier 46. When the PCI expansion card 28a is mounted on board 48, the connector 32a engages the connector 50. Because the connector 50 is coupled to the connector 54, the PCI expansion card is electrically connected to the connector 54. The carrier assembly 100 is inserted into the slot 102 in sidewall 104 of the chassis 26a. The guides 120 guide the assembly 100 to the backplane 108 so that the connector 54 is engaged with the connector 106. When the carrier assembly 100 is fully seated in the chassis 26a, the carrier handle 38 is in the slot 102 and is flush mounted with the chassis sidewall 104. For extraction, the handle 38 may be easily manually grasped and the carrier assembly withdrawn from the chassis 26a. There is no need to remove the chassis top cover 27 from the chassis 26a.

As it can be seen, the principal advantages of these embodiments are that a carrier assembly is insertable into the chassis by sliding the carrier into a slot in a sidewall of the chassis and engaging the carrier assembly connector with a backplane connector in the chassis. The carrier assembly is slidably engaged by guide members within the chassis to guide the carrier assembly to its respective backplane connector and avoid contact or resulting damage to other components within the chassis. A handle on the carrier assembly, mounts flush with the slot in the chassis sidewall. For extraction of the carrier assembly, the handle is grasped and the carrier assembly is withdrawn from the chassis through the slot.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:

a chassis having a slot formed in a wall thereof;

at least one microprocessor mounted in the chassis;

at least one input coupled to provide input into the microprocessor;

at least one mass storage coupled to the microprocessor;

at least one display coupled to the microprocessor by a video controller;

at least one memory coupled to provide storage to facilitate execution of computer programs by the microprocessor;

an expansion card carrier removably mounted in the slot formed in the chassis, the card carrier including a top, and having a handle at a first end and a connector slot formed in a second end, opposite the first end;

a jumper board mounted on the card carrier, the jumper board having a first connector and a second connector; and an expansion card inserted top down into the carrier and electrically connected to the jumper board, the expansion card having a connector engaged with the first connector of the jumper board upon insertion, the second connector of the jumper board being coupled to the first connector and positioned in the connector slot of the card carrier, the handle being flush mounted with the wall of the chassis.

2. An expansion card assembly in combination with a computer system comprising:

a chassis having a slot formed in a wall thereof;

an expansion card carrier including a top, the carrier being removably mounted in the slot formed in the wall of the chassis;

the carrier having a handle at a first end and a connector slot at a second end, opposite the first end;

a jumper board mounted on the card carrier, the jumper board having a first connector and a second connector; and an expansion card inserted top down into the carrier and electrically connected to the jumper board, the expansion card having a connector engaged with the first connector of the jumper board upon insertion, the second connector of the jumper board being positioned in the connector slot of the card carrier, the second connector coupled to the first connector, the handle being flush mounted with the wall of the chassis.

3. The assembly as defined in claim 2 wherein the jumper board includes a first edge and a second edge being perpendicular to each other, the first connector on the jumper board being attached adjacent the first edge of the jumper board and extending in a first direction.

4. The assembly as defined in claim 3 wherein the second connector on the jumper board is attached adjacent the second edge of the jumper board and extends in a second direction perpendicular to the first direction.

5. The assembly as defined in claim 2 wherein the card carrier is formed of a plastic material.

6. The assembly as defined in claim 2 wherein the chassis includes a vertical backplane and a connector, the connector being positioned on the vertical backplane.

7. The assembly as defined in claim 6 wherein the card carrier is insertable into the carrier slot and slidable in the chassis to a position wherein the second connector of the jumper board is engaged with the connector on the vertical backplane.

8. An expansion card assembly comprising:
   a card carrier having a top a handle at a first end and a connector slot at a second end, opposite the first end;
   a jumper board including a first connector mounted on the card carrier;
   a card inserted top down into the carrier and electrically connected to the jumper board, the card having a connector engaged with the first connector on the jumper board upon insertion; and
   a second connector on the jumper board, positioned in the connector slot and coupled to the first connector.

9. The assembly as defined in claim 1 wherein the card carrier is formed of a plastic material.

10. An expansion card system comprising:
    an expansion card carrier including a top, a handle at a first end and a connector slot formed therein at a second end, opposite the first end;
    a jumper board mounted on the card carrier, the jumper board having a first connector and a second connector; and
    an expansion card inserted top down into the carrier and electrically connected with the jumper board, the expansion card having a connector engaged with the first connector of the jumper board upon insertion, the second connector of the jumper board being coupled to the first connector and positioned in the connector slot on the card carrier.

11. The system as defined in claim 10 wherein the card carrier is formed of a plastic material.

12. A method of mounting an expansion card in a computer chassis, having a carrier slot formed in a wall of the chassis, comprising:
    providing an expansion card carrier with a top, a handle at a first end and a connector slot at a second end, opposite the first end, the expansion card carrier being removably mounted in the carrier slot formed in a wall of the chassis;
    mounting a jumper board on the card carrier, the jumper board having a first connector and a second connector;
    using the handle for inserting the card carrier into the carrier slot;
    sliding the card carrier into the chassis, the chassis including a backplane connector, the connector slot of the card carrier being positioned to plug the second connector of the jumper board into a back plane connector within the chassis and the handle being flush mounted with the wall of the chassis; and
    inserting an expansion card top down into the carrier to provide electrical connection with the jumper board upon insertion, the expansion card having a connector engaged with the first connector of the jumper board upon insertion, the second connector of the jumper board being coupled to the first connector and being mounted in the connector slot of the carrier.

* * * * *